United States Patent [19]
Fischer

[11] 3,813,477
[45] May 28, 1974

[54] ELECTRIC POWER CABLE APPARATUS FOR TRANSMITTING POWER FROM A FLOATING STRUCTURE

[75] Inventor: Frank E. Fischer, Ossining, N.Y.
[73] Assignee: Consolidated Edison Company of New York Inc., New York, N.Y.
[22] Filed: July 12, 1972
[21] Appl. No.: 270,957

[52] U.S. Cl............... 174/70 R, 61/72.2, 138/120, 174/27, 174/68 C, 174/103 R, 285/223
[51] Int. Cl............................................ H02g 9/04
[58] Field of Search.... 174/25 R, 24, 27, 28, 103 R, 174/15 C, 115, 68 C, 70 R; 138/120; 285/223; 61/72.3, 72.2

[56] References Cited
UNITED STATES PATENTS

| | | | |
|---|---|---|---|
| 1,475,090 | 11/1923 | Taylor | 138/120 X |
| 1,822,624 | 9/1931 | Hoeftmann | 138/120 X |
| 2,295,510 | 9/1942 | Ball et al. | 138/120 X |
| 2,306,527 | 12/1942 | Daniels | 174/15 C |
| 3,681,927 | 8/1972 | Dul et al. | 61/72.3 |

FOREIGN PATENTS OR APPLICATIONS

| | | | |
|---|---|---|---|
| 564,680 | 10/1944 | Great Britain | 174/15 C |
| 517,376 | 2/1955 | Italy | 174/68 C |

OTHER PUBLICATIONS

Backshall, G. C., New Duct For The Protection Of Shore-End Of Submarine Cables, Post Office Elec. Eng. (GG) Vol. 63, Pt. 4 1/71 pp. 218-219.

Primary Examiner—Bernard A. Gilheany
Assistant Examiner—A. T. Grimley
Attorney, Agent, or Firm—Brooks Haidt & Haffner

[57] ABSTRACT

A self-contained, fluid impregnated, high voltage, electric power cable or cables extending between a fixed point underwater and a movable platform, such as the deck of a barge floating on such water, the cable or cables being surrounded by a series of interconnected rigid pipes having interconnections which permit limited tilting of the axis of one pipe with respect to the axes of the next adjacent pipes so as to avoid bending of the cable or cables which would damage the electric characteristics thereof.

15 Claims, 7 Drawing Figures

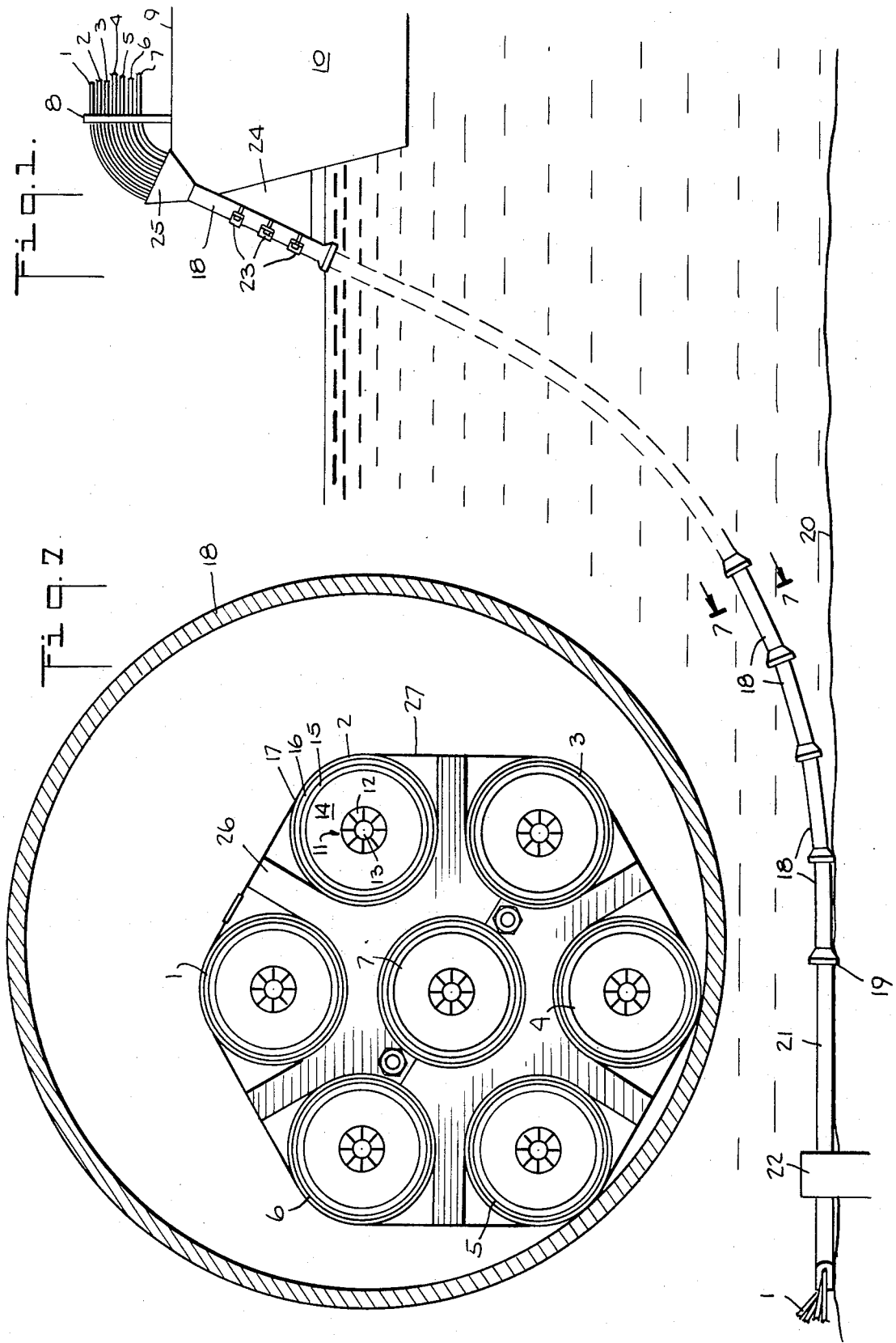

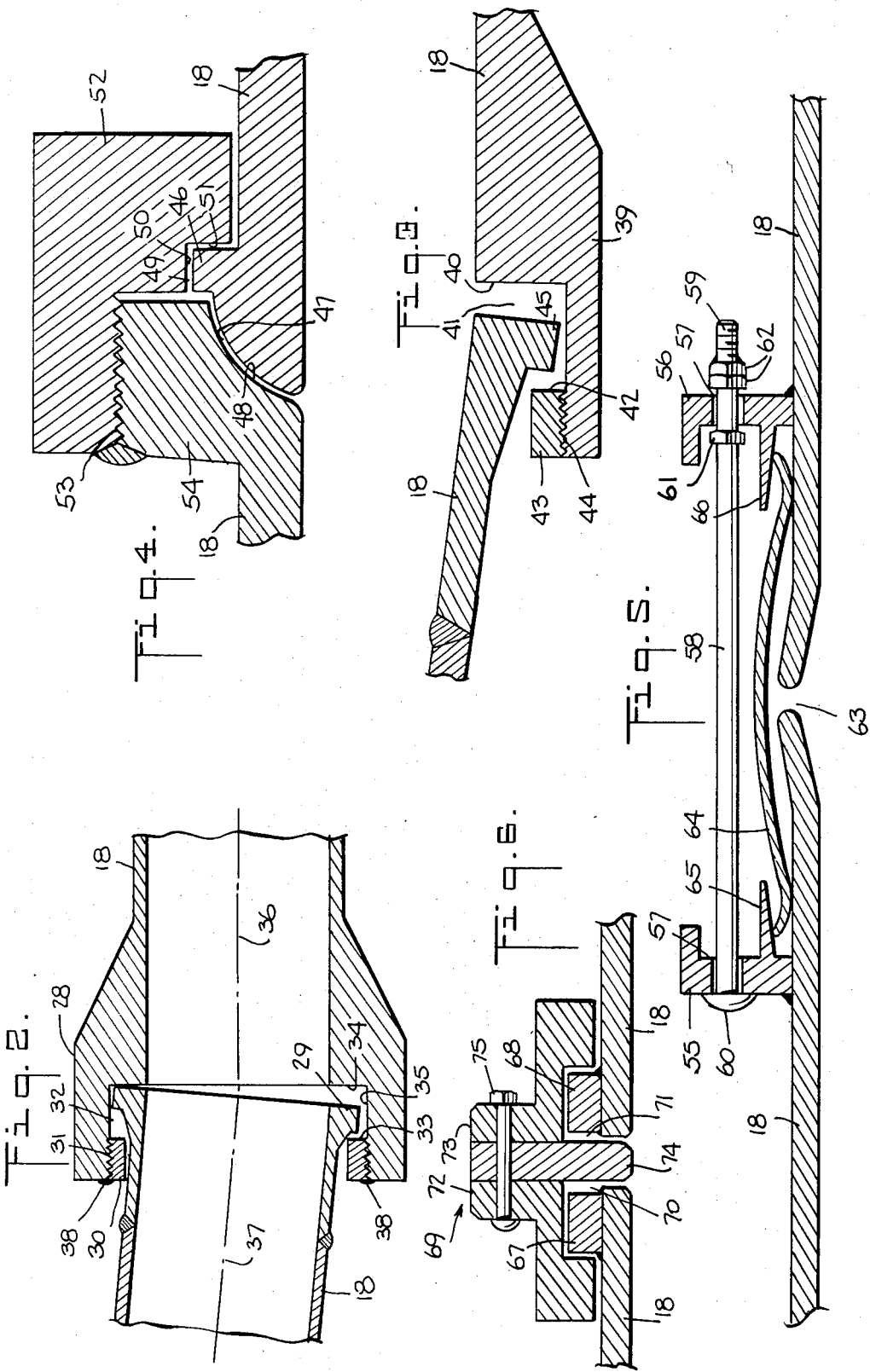

ELECTRIC POWER CABLE APPARATUS FOR TRANSMITTING POWER FROM A FLOATING STRUCTURE

This invention relates to high voltage electricity transmission systems which extend between a pair of structures at least one of which is movable with respect to the other such as, for example, a transmission system which extends between a fixed structure on the shore, then on the bed of a body of water and to a barge carrying an electricity generating plant and floating on such body of water. More particularly, the invention relates to a high voltage electric power transmission cable and a protective conduit for use in installations where the cable is subjected to repeated movement which could affect the electrical characteristics.

With the increasing demand for electric power, it has been necessary to construct new generating plants, and from an economic standpoint it is desirable to locate the generating plant as close as possible to the user and to transmit the energy at high voltage from the plant to a conversion or distribution point near the user. However, in heavily populated areas where the demand often is greatest, it is difficult to locate the generating plant on land in such areas, due to the scarcity of suitable land and for other reasons, and resort has been had, where there is a body of water near such area, to the construction of generating plants on floating platforms, such as barges, which float on such body of water.

Such location of a generating plant on a floating platform creates problems in the transmission of the electrical energy from the platform to the land area bordering the body of water because, even though anchored, the platform raises and lowers and shifts laterally on the water surface with the wind, tide, etc., which applies stresses to the transmission wires or cables. In addition, above water suspension of the wires or cables creates weather and spray problems, and if the distance between the shore and the platform is large, supports hazardous to navigation may be required. In general, exposed and uninsulated, high voltage parts are undesirable in such conditions.

Studies have shown that oil-impregnated, self-contained, high voltage cables located under water from the shore line to the floating platform are the best solution for transmitting the electrical energy from the floating platform. Long lengths of oil-impregnated, self-contained, high voltage cable can be made, and such cable is flexible to a limited degree, can be easily laid from a boat, does not require underwater joints, and does not have exposed, high voltage parts. As used herein, the expression "fluid impregnated, self-contained" cable means a cable having at least one conductor surrounded by insulation, such as layers of paper, which is impregnated with a fluid, such as oil, under pressure and the insulation of which is surrounded by a fluid impermeable sheath, the sheath, insulation and conductor being flexible enough to permit bending to a limited degree, such as for coiling on a reel or laying of the cable, without damage to the electrical properties thereof.

On the other hand, a self-contained cable of the type described cannot be permitted to kink or bend excessively during installation or use and repeated bending, above an amount dependent upon the cable construction can cause damage to the electrical properties of the cable. Accordingly, it is not simply a matter of laying such a cable between the shore and the platform. This is more readily appreciated when it is realized that the platform rocks and repeatedly moves up and down due to wave and wind action, may move as much or more than 35 feet vertically due to tides and waves and may move as much as 50 feet horizontally, in any direction, because of such forces even though it is anchored.

It is one object of the invention to provide a high voltage electrical transmission system which may extend from a fixed or movable point or structure to a movable structure, at least part of the path thereof being under water if desired, without being damaged by movement of the movable structure.

In accordance with the preferred embodiment of the invention, one or more of such self-contained, high voltage cables extends without interruption from above water at the shore into the water and along the bed thereof to a point where it then extends upwardly to a platform above the water and on a floating structure. Generally, from the shore to such point the cable will be substantially motionless, but from such point to the platform it must bend and will move as a result of the platform movement. To avoid excessive bending of the cable, i.e., bending which will damage the electrical properties thereof, it is surrounded from substantially such point to substantially the platform by a plurality of lengths of rigid pipes connected end-to-end and in series, the connections therebetween being such as to permit limited tilting of the axis of each pipe with respect to the axes of the next adjacent pipes. The limited tilting of one pipe with respect to the next avoids imposing high forces on the platform, but the extent of the tilting and the length and number of the pipes is selected so as to prevent such excessive bending of the cable. Because the cable is fluid impervious, it is not necessary that the connections between the pipes be water-tight, and in fact, a flow of water through the pipes is desirable to cool the cable contained thereby.

In accordance with a further aspect of the invention, a plurality of such cables are fastened together in side-by-side relationship and are similarly surrounded by a plurality of the so-connected pipes.

Advantages and other objects of the invention will be apparent from the following detailed description of preferred embodiments thereof, which description should be considered in conjunction with the accompanying drawings, in which:

FIG. 1 is a schematic, side elevation view of the apparatus of the invention extending between a fixed point under water to a barge floating on such water;

FIGS. 2–6 are fragmentary, cross-sectional, side elevation views of various forms of pipe couplings which may be used in the apparatus of the invention; and, FIG. 7 is an enlarged, cross-sectional, end view of a portion of the apparatus of the invention and is taken along the line 7—7 indicated in FIG. 1.

FIG. 1 illustrates schematically a plurality of self-contained, fluid impregnated cables 1–7, secured by an upright 8 to the deck 9 of a floating barge 10. Each of the cables 1–7 comprises a central conductor 11 (FIG. 7) which may comprise several segments 12 surrounding a central oil duct 13. The conductor 11 is surrounded by insulation 14 which may be, for example, a plurality of layers of oil impregnated paper tape, which insulation 14 is surrounded by one or more layers of insulation 15 and by a further layer 16 of insulating or semi-conducting material. Such layers 14–16 are in turn surrounded by a fluid impervious sheath 17 which may, for example, be made of lead and which may be surrounded by a layer or layers of armor. Thus, each of the cables is self-contained and fluid impervious and, except for the mechanical problems involved, could be laid under water so as to extend from a shore point to a floating platform, such as the deck 9 of the barge 10, and used to transmit high voltage electrical power.

However, as pointed out hereinbefore, it is necessary to prevent excessive bending or kinking of such cables 1–7 in order to prevent destruction of or damage to the electrical properties of the cable, e.g., its ability to withstand high voltages. Accordingly, in accordance with the invention, the cables 1–7 are surrounded by a plurality of series connected rigid pipes 18, which, preferably, are identical in construction, from the point 19 where the cables extend upwardly from the water bed 20 to the barge 10. Preferably, the interior cross-section of each pipe 18 is larger than the exterior cross-section of the cable or cables contained therein so that there is space between the interior wall of the pipe 18 and the cable or cables. At the point 19, the first of the rigid pipes 18 is connected to a rigid pipe 21 which is anchored in a pipe anchor or caisson 22, which may, for example, be a concrete caisson embedded in the water bed 20. From the caisson 22 to the shore line the cables 1–7 may be surrounded by additional rigid pipes which, however, need not be connected together in the same manner as the pipes 18. On the other hand, except when it is desired to prevent damage to the cables by ships' anchors, etc., it is not necessary to surround the cables 1–7 by pipes from the caisson 22 to the shore, since from the caisson 22 to the shore the cables are relatively fixed in position.

From the point 19 to the barge 10 the cables are subject to bending during and after installation, the bending after installation resulting from motion of the barge 10 with wind, waves and tides, and from the effect of tides on the portions of the cables which extend from the point 19 to the barge 10. It is well-known in the art that self-contained cables of the type described have a limited flexibility and can be subjected to repeated bending to a limited extent without damage to the electrical properties thereof. However, the amount of bending is dependent upon the cable construction, and usually, at least for repeated bending, any portion of the cable preferably should not be bent with respect to the axis thereof more than approximately 5° and, at most, 10°.

The pipes 18 are rigid pipes and are connected together by couplings, such as those described hereinafter in connection with FIGS. 2–6, which permit tilting of the axis of one pipe 18 with respect to the axis of the next pipe 18 but which limit such tilting so as to prevent bending of the enclosed cables by an amount sufficient to damage the electrical properties thereof. The construction of the couplings and the length of the pipes is selected so as to limit the bending of the enclosed cables to the desired extent. For example, if it is assumed that the desired limit on the bending is 5°, that the barge 10 has a vertical movement of approximately 35 feet and the length of the cables from the point 19 to the barge 10 is approximately 475 feet, the cables may be enclosed by approximately 47 pipes 18, each 10 feet in length and having couplings which limit the tilting of the axis of one pipe 18 to the axis of the next pipe 18 to 5°.

Preferably, the uppermost pipe 18 is secured by clamps 23 to a bracket 24 secured to the side of the barge 10. As the cables 1–7 leave the pipe 18 they are separated in a manifold 25 from which they extend to the upright 8.

The cables 1–7 may be drawn through the pipes 18 either during or after the laying of the cables 1–7. Alternatively, the pipes 18 may be split longitudinally and held together by releasable clamps which would permit the pipes 18 to be assembled around the cables 1–7 after they have been, or as they are, laid between the point 19 and the barge 10.

Although each cable 1–7 may be separately enclosed by a series of pipes 18, preferably the pipes 18 enclose a plurality of cables as is shown in FIGS. 1 and 7. When a plurality of cables is enclosed in the pipes 18, preferably they are spaced apart and secured to a spacer or spider 26 having a plurality of apertures between the arms thereof for receiving the cables 1–7. The cables are secured to the spider 26 by means of a strap 27 extending around the cables 1–7.

Although the couplings between the pipes 18 may have various forms, preferred forms thereof are shown in FIGS. 2–6. In FIG. 2, one end of the pipe 18 has an enlarged portion 28 for receiving the opposite end of the next adjacent pipe 18 which has a circumferentially extending projection or flange 29. The enlarged portion 28, together with a ring 30, having a threaded connection 31 with the enlarged portion 28, form a channel 32 with dimensions larger than those of the projection 29 so as to loosely receive the projection 29. Thus, the distance between the radially extending walls 33 and 34 of the channel 32 is greater than the width of the projection 29 longitudinally of the pipe 18, and the radius of the bottom wall 35 of the channel 32 is greater than the radius of the projection 29. Also, the internal radius of the ring 30 is greater than the radius of the external periphery of the pipe 18, so that the axis 36 of one pipe 18 can tilt up to 5° with respect to the axis 27 of the next pipe 18, but after such tilting, further tilting is limited by engagement of the projection 29 with the walls of the channel 32.

If desired, the ring 30 may be spot or otherwise welded, such as at 38, to the enlarged portion 28, so as to prevent loosening of the ring 30.

The connection between the pipe ends illustrated in FIG. 3 is similar to the one shown in FIG. 2, but the locations of the projection on one end of the pipe and the channel on the opposite end of the pipe are reversed. In the construction shown in FIG. 3, one end of the pipe 18 has an inwardly extending portion 39, one portion of which forms a radially extending wall 40 of a channel 41. The opposite radially extending wall 42 is formed by a ring 43 having a threaded connection 44 with the inwardly extending portion 39.

The opposite end of the pipe 18 has a circumferentially extending projection 45, which is received in the channel 41 and the channel 41, as well as the projection 45, are dimensioned with respect to each other so as to limit the tilting of the axis of the two adjacent pipes 18 with respect to each other to the desired amount, e.g., 5°. Thus, tilting of one pipe 18 to the other pipe 18 is limited by engagement of the projection 45 with the walls of the channel 41.

The connection or coupling shown in FIG. 4 is similar to the one shown in FIG. 2, except that one end of the pipe 18, in addition to having a circumferentially extending projection 46, has a curved surface 47, which is closely adjacent a corresponding and matching surface 48. The curved surfaces 47 and 48 permit tilting of one pipe 18 with respect to the next pipe 18 but keep the spacing between the ends of the pipes to a minimum in all relative positions thereby keeping the entrance of mud and other debris into the interior of the pipes to a minimum. In addition, the channel 49 for receiving the projection 46 has both its bottom wall 50 and a radially extending side wall 51 formed by portions of a ring 52 having a threaded connection 53 with an enlarged portion 54 on the end of the other pipe 18. Again, the relative dimensions of the projection 46 and the channel 50 are selected so as to limit the tilting of the axis of one pipe 18 with respect to the axis of the next adjacent pipe 18 by the desired amount, i.e., the amount which will prevent bending of the enclosed cables to an extent which will damage the electrical properties thereof.

The connection or coupling shown in FIG. 5 comprises projections 55 and 56 at opposite ends of the pipes 18, which are, for example, rings welded to the pipes at the ends thereof. Each projection 55 and 56 has holes 57 therein for loosely receiving a rod 58. The rod 58 may be in the form of a bolt having threads 59, a head 60 and a peripheral abutment 61. Preferably, the projections 55 and 56 extend circumferentially of the pipes 18, and there are a plurality of such rods 58 spaced circumferentially of the pipes 18. Tilting of the axis of one pipe 18 with respect to the axis of the next adjacent pipe 18 is limited by the abutment 61 on the rod 58, and a pair of adjustable nuts 62 on the threaded portion 59 of the rod 58.

Since the enclosed cables are self-contained and fluid impervious, it is unnecessary that the connections or couplings between the pipes be fluid impervious. However, it is desirable to prevent mud and other debris from entering into the pipes 18. In the embodiment shown in FIG. 5, the space 63 between the ends of the two pipes 18 is covered by a resilient ring 64 which is held in place by a pair of ring-like members 65 and 66 extending respectively from the projections 55 and 56.

In the connection or coupling of the embodiment shown in FIG. 6, the opposite ends of a pipe 18 may be identical in construction and comprise projections 67 and 68 which, preferably, extend around the circumference of the pipe 18. The ends of the pipes are held together by a clamp 69 having a pair of channels 70 and 71, which receive the projections 67 and 68 and which are dimensioned with respect to the projections 67 and 68 so as to limit tilting of the axes of the two adjacent pipes in the manner described hereinbefore. The clamp 69 comprises a pair of rings 72 and 73 spaced apart by a further ring 74 and secured together by a plurality of bolts 75. If desired, the ring 74 may be omitted, but the use thereof with various thicknesses permits easy adjustment of the permitted amount of tilting of the axes of the two adjacent pipes.

Although the invention has been illustrated as extending from a fixed point 19 to a movable structure in the form of a barge 10, it will be apparent to those skilled in the art that the apparatus of the invention may also be used in connection with a transmission system extending between two movable structures. In addition, although the apparatus of the invention is particularly useful for transmission systems which extend under water, it will be apparent to those skilled in the art that under certain circumstances it is also useful for the protection of cables extending above water.

What is claimed is:

1. High voltage electric cable apparatus extending between a predetermined point to a movable structure having a high voltage, electric power generating plant thereon, said apparatus comprising at least one self-contained, fluid impregnated, high voltage cable comprising an inner conductor surrounded by insulation and a fluid impervious, flexible, metal sheath, said cable being constructed to permit bending thereof including said sheath by a predetermined amount without damage to the electrical characteristics thereof and said cable being electrically connected at one end to said plant, and a plurality of rigid pipes connected in series and surrounding said cable from substantially said point to substantially said structure, said pipes being connected to each other by connections permitting tilting of the axis of one pipe with respect to the axis of the next adjacent pipe but preventing tilting thereof by an amount which will cause bending of said cable to exceed said predetermined amount.

2. Apparatus as set forth in claim 1, wherein a plurality of said cables are surrounded by said pipes, said cables being secured to each other.

3. Apparatus as set forth in claim 2, wherein said cables are secured to each other by a plurality of spiders spaced from each other lengthwise of said cables, each of said spiders having a plurality of apertures therein, one for each said cable, which receive said cables, and means for holding said cables in said apertures.

4. Apparatus as set forth in claim 1, wherein the interior cross-section of said pipes is larger than the exterior cross-section of said cable to thereby provide space between the interior wall of said pipes and the exterior of said cable.

5. Apparatus as set forth in claim 1, wherein each of said connections is fluid pervious.

6. Apparatus as set forth in claim 1, wherein each of said connections comprises a projection at at least one end of each pipe extending in the circumferential direction and means on the end of the next adjacent pipe for loosely engaging said projection and limiting tilting movement thereof with respect to said next adjacent pipe.

7. Apparatus as set forth in claim 6, wherein said means on the end of the next adjacent pipe comprises a channel extending in the circumferential direction and receiving said projection with the walls of said channel spaced, at least in part, from said projection.

8. Apparatus as set forth in claim 7, wherein said channel has radially extending side walls and a bottom wall extending in the circumferential direction and said side walls of said channel are spaced apart in the lengthwise direction of the pipe a distance greater than the dimension of said projection in the lengthwise direction of the pipe and said bottom wall has a radial dimension different from that of said projection.

9. Apparatus as set forth in claim 8, wherein one of said side walls is on a ring having a threaded connection with the end of the pipe having said channel.

10. Apparatus as set forth in claim 6, wherein said means on the end of the next adjacent pipe comprises a second projection on said last-mentioned end extending in the circumferential direction and coupling means loosely coupling said second projection to said first-mentioned projection.

11. Apparatus as set forth in claim 10, wherein said coupling means comprises a ring having at least one channel extending around said projections, the dimensions of said channel being greater than the dimensions of said projections.

12. Apparatus as set forth in claim 10, wherein said coupling means comprises a plurality of rods extending between said projections, each of said rods being movable to a predetermined extent with respect to at least one of said projections.

13. Apparatus as set forth in claim 1, wherein said point is underwater and said structure is a structure floating on said water.

14. Apparatus as set forth in claim 13, wherein said cable is fixed in position at said point and extends from said point in a direction opposite from the direction in which it extends to said structure to a further point above water which is fixed in position and wherein said cable is secured to said structure.

15. Apparatus as set forth in claim 1, wherein said connections limit the tilting of the axis of one pipe with respect to the other to a maximum of 10°.

* * * * *